US006799642B2

(12) United States Patent
Wolf et al.

(10) Patent No.: US 6,799,642 B2
(45) Date of Patent: Oct. 5, 2004

(54) VIBRATION DAMPER BETWEEN TWO COMPONENTS

(75) Inventors: Gunter Wolf, Oppenweiler (DE); Phillip Neumann, Stuttgart (DE); Helmut Lux, Waiblingen (DE); Lothar Ulrich, Schwaikheim (DE)

(73) Assignee: Andreas Stihl AG & Co., Waiblingen (DE)

( * ) Notice: Subject to any disclaimer, the term of this patent is extended or adjusted under 35 U.S.C. 154(b) by 0 days.

(21) Appl. No.: 10/066,741

(22) Filed: Feb. 6, 2002

(65) Prior Publication Data

US 2002/0104665 A1 Aug. 8, 2002

(30) Foreign Application Priority Data

Feb. 7, 2001 (DE) ......................................... 101 05 826

(51) Int. Cl.[7] ................................................. F16M 1/00
(52) U.S. Cl. ............................... 173/162.2; 173/162.1; 173/211; 30/383
(58) Field of Search ........................... 173/162.1, 162.2, 173/210, 211; 30/383, 381; 267/170, 71

(56) References Cited

U.S. PATENT DOCUMENTS 3,841,255 A * 10/1974 Mansfield ................... 114/299
3,934,345 A * 1/1976 Hirschkoff .................... 30/381
4,136,415 A * 1/1979 Blockburger ................... 441/2
5,361,500 A * 11/1994 Naslund et al. .......... 173/162.2
5,368,107 A    11/1994 Taomo
5,722,645 A *  3/1998 Reitter ......................... 30/381
6,375,171 B1 * 4/2002 Zimmermann et al. .. 173/162.1

* cited by examiner

Primary Examiner—Scott A. Smith
Assistant Examiner—Michelle Lopez
(74) Attorney, Agent, or Firm—Walter Ottesen

(57) ABSTRACT

A vibration damper is disposed between two components (2, 3) of a portable handheld work apparatus (4). The vibration damper is held especially between a housing (6), which holds an internal combustion engine (5), and a handle (7) which is fixed on the housing (6) for guiding the work apparatus (4). The vibration damper includes a coil spring (9) and respective attachment elements (11, 12) at the ends (10, 13) of the coil spring. A coupling member (17) is provided to ensure that the work apparatus can be guided notwithstanding a break of a coil spring. The coupling member (17) projects through the coil spring (9) and bridges the axial distance (16) between the attachment elements (11 and 12). The coupling member (17) is connected to each attachment element (11, 12) so that it cannot separate therefrom.

12 Claims, 7 Drawing Sheets

VIBRATION DAMPER BETWEEN TWO COMPONENTS

BACKGROUND OF THE INVENTION

U.S. Pat. No. 5,368,107 discloses a vibration damper between the housing of a motor-driven chain saw as a first component and the handle thereof as the second component. The vibration damper is configured as a coil spring. Each of the ends of the coil spring is provided with an attachment element for fixing the coil spring to the housing and to the handle. The coil spring is held with turns at each end to the attachment elements. The fixing elements lie axially to the longitudinal center axis of the coil spring and are at a spacing with respect to each other. If the vibration damper breaks, the chain saw can be guided only with difficulty especially when the connection between the handle and the housing is completely lost.

SUMMARY OF THE INVENTION

It is an object of the invention to provide a vibration damper of the above kind which is so improved that an overextension of the vibration damper is avoided and it is still possible to guide the chain saw even when the vibration damper is broken.

The vibration damper of the invention is for mounting between first and second components of a portable handheld work apparatus. The vibration damper includes: a coil spring defining a longitudinal center axis and having first and second end portions; first and second attachment elements; the coil spring being securely attached at the first end portion with the first attachment element to the first component; the coil spring being securely attached at the second end portion with the second attachment element to the second component; the first end portion of the coil spring having several first turns and the second end portion of the coil spring having several second turns; the first end portion form-tightly engaging the first attachment element with at least a part of one of the first turns in the direction of the longitudinal center axis; the second end portion form-tightly engaging the second attachment element with at least a part of one of the second turns in the direction of the longitudinal center axis; the first and second attachment elements being disposed approximately on the longitudinal center axis and lying at a distance axially opposite each other; and, a coupling member extending through the coil spring to bridge the distance and the coupling member being connected to the first and second attachment elements so as to prevent the coupling member from separating therefrom.

When there is a break of the coil spring, a form-tight connection is maintained between the components connected by the vibration damper because a coupling member, which bridges the axial distance of the attachment elements, is arranged within the coil spring (between these attachment elements of the coil spring) and the coupling member is connected to each attachment element so that it cannot separate therefrom. The work apparatus can still be adequately reliably guided or held notwithstanding a break of the vibration damper.

It is practical to configure the coupling member as a rope and preferably as a steel rope. The rope is provided with respective holders at its ends and the holders have respective end faces facing toward each other. The holders engage form-tight behind respective edges of the attachment elements with these end faces. The rope assumes the emergency connection of the two components when there is a break of the coil spring in the region between the attachment elements. Furthermore, the rope limits also the maximum deflection of the coil spring and protects the vibration damper against overload.

If the rope is configured essentially as a thrust-stiff rope and especially as a steel rope, then the coupling member can be inserted simply in corresponding assembly or passthrough openings of the attachment elements. Additional guide measures or aids for threading as are needed for limp ropes are unnecessary.

The length of the rope is purposefully so dimensioned that it is greater than the distance of the edges of the attachment elements lying between the holders. The length of the rope is greater than the length of the unloaded coil spring. In this way, it is ensured that the rope does not limit the spring path of the vibration damper but does limit the possible spring path in the context of the permissible spring tension in each case and defines an effective protection against a tear-off when there is a break of the coil spring.

The holders are fixed at the ends of the rope and are advantageously guided in receptacle sections of the attachment element with slight radial play. These receptacle sections are configured to have a cylindrical shape.

In a preferred embodiment, at least one attachment element is provided with a lateral axial slot whose depth extends radially from the receptacle section up to the peripheral edge of the attachment element. The width of the slot is less than the maximum outer diameter of the holder which comes to rest in the receptacle section. The slot extends over the entire axial length of the attachment element so that the rope is guided radially to the attachment element through the slot into the attachment element and the holder can be fixed at the particular rope end in the receptacle section of the attachment element so that it cannot separate therefrom.

In an embodiment of the vibration damper which is simple to assemble, the receptacle section is so configured that its axial extension is greater than the axial length of the holder. For this reason, the holder can move in the axial direction of the attachment element and of the coil spring axially back and forth in the receptacle section. The maximum outer diameter of the second holder is therefore so selected that this diameter is greater than the maximum outer diameter of the first holder on the rope. The attachment element with the receptacle section for the second holder is provided at the base of the receptacle section with a through opening whose diameter is somewhat greater than the maximum outer diameter of the first holder. During assembly of the vibration damper, the rope with the first holder can be guided through the through opening at the base of the receptacle section for the second holder. The second holder is fixed in the receptacle section and the rope end with the first holder is guided through a slot from the peripheral edge of the other attachment element to the receptacle section in this attachment element where the first holder is fixed form-tight in the corresponding receptacle section.

The coupling member lies approximately centered in the coil spring in the assembled state of the vibration damper. It can also be practical to arrange the coupling member at a radial distance to the longitudinal axis of the coil spring in the proximity of the turns of the coil spring. The coupling member can be arranged at one end of the vibration damper loaded during operation of the portable work apparatus primarily in tension.

BRIEF DESCRIPTION OF THE DRAWINGS

The invention will now be described with reference to the drawings wherein.

DESCRIPTION OF THE PREFERRED EMBODIMENTS OF THE INVENTION

Figure 2:
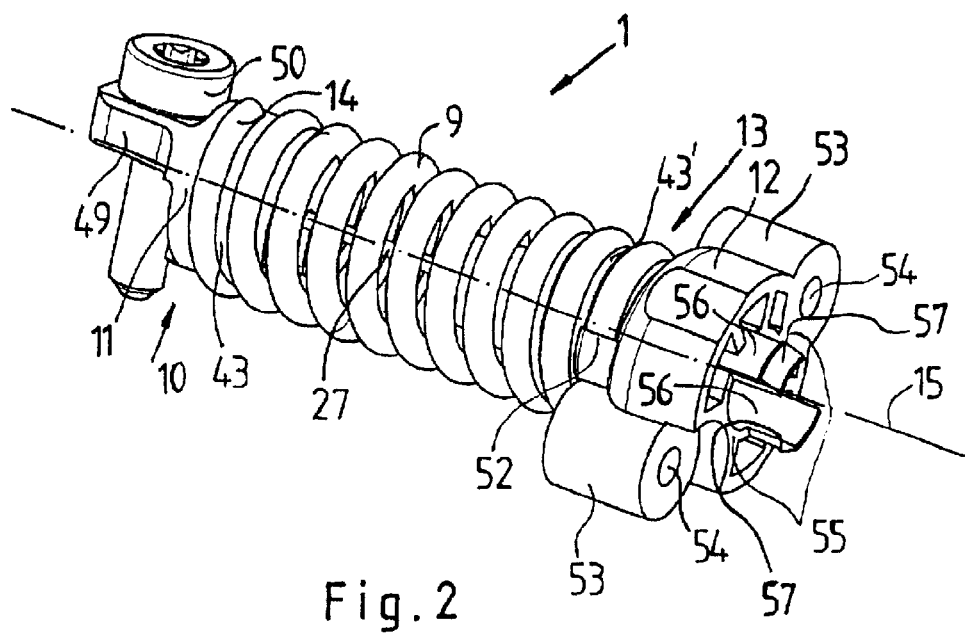
FIG. 2 is a perspective view of the vibration damper of FIG. 1.
Figure 3:
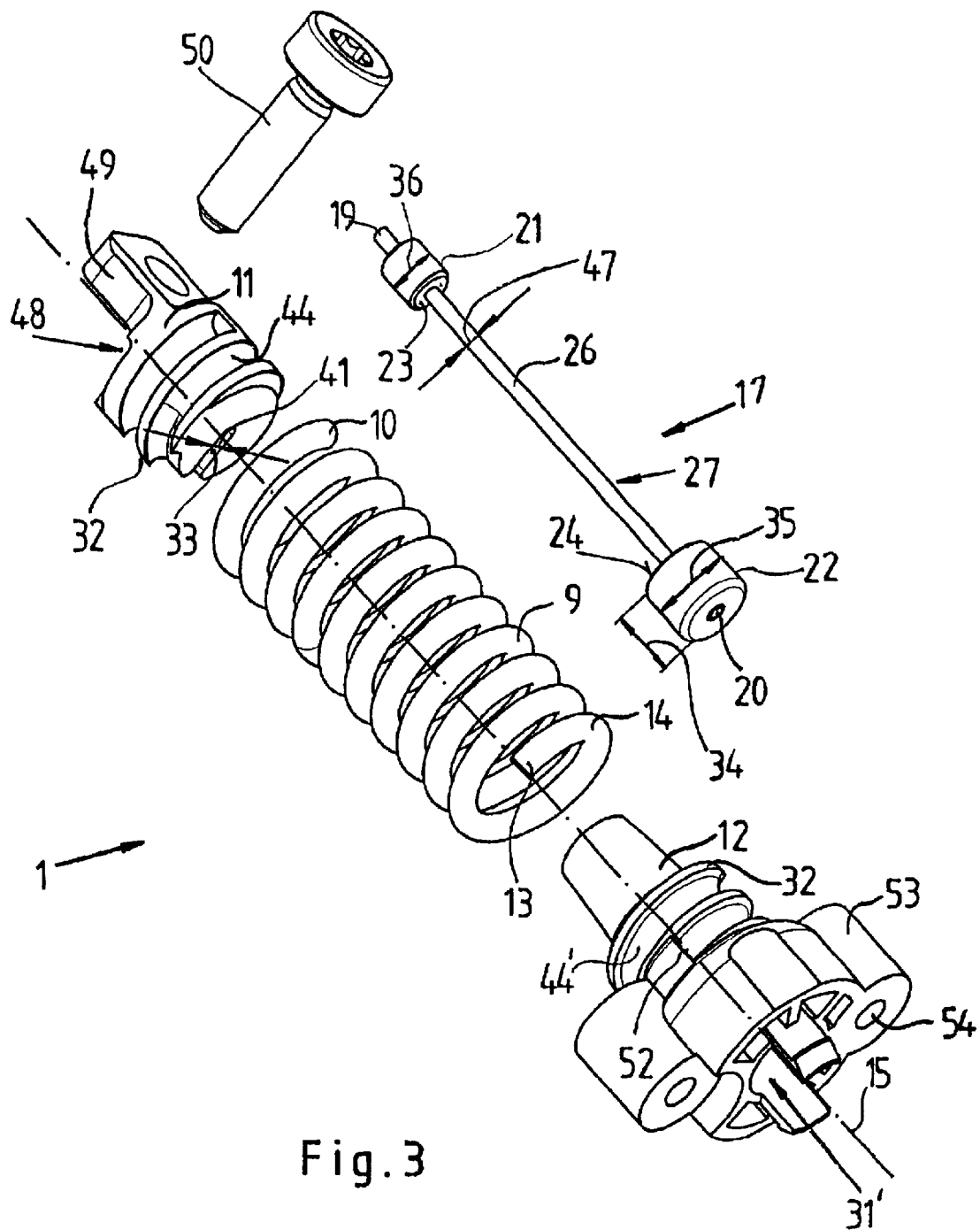
FIG. 3 is an exploded view of the vibration damper of FIG. 1.
Figure 4:
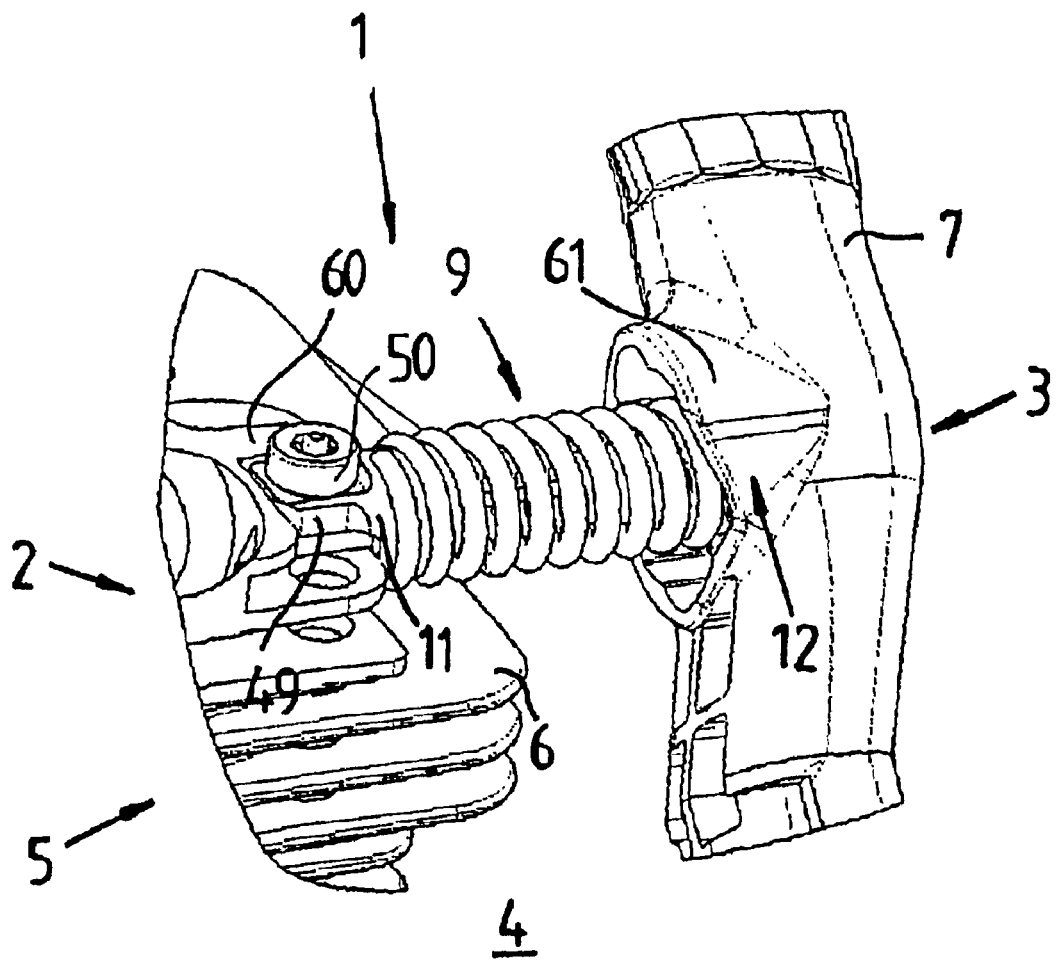
FIG. 4 is a schematic view of the vibration damper of FIG. 1 shown fixed between an internal combustion engine and a handle of a portable work apparatus.

The vibration damper 1 shown in FIGS. 1 to 4 is fixed between a first component 2 and a second component 3. As shown in FIG. 4, the vibration damper 1 is fixed between an engine housing 6, especially a cooling rib 60 of an engine 5, and a handle 7 of a portable handheld work apparatus 4. The engine housing 6 forms the first component 2 and the handle 7 forms the second component 3. The portable handheld work apparatus 4 can be a motor-driven chain saw, a cutoff machine, a brushcutter, a blower or the like on which the vibrations of the engine are to be kept away from the handle held by the operator.

The vibration damper 1 comprises a coil spring 9 which is cylindrically wound and comprises several turns 42 of a steel wire of constant diameter. The turns 42 lie at a spacing one next to the other. It can be practical to configure the coil spring 9 to also be conical or to change the thickness of the turns 42 over the length of the coil spring 9. A first end 10 of the coil spring 9 is screwed onto the attachment element 11 made especially of metal, light metal, plastic or another elastomeric material. As shown in FIG. 4, the attachment element 11 functions to fix the vibration damper 1 to the first component 2, namely, the engine housing 6 of the internal combustion engine 5. With the second end 13, the coil spring 9 is connected via an additional attachment element 12 to the second component 3, the handle 7, of the portable handheld work apparatus 4. The attachment elements (11, 12) are provided with respective cylindrical sections (43, 43') for the form-tight connection of the attachment elements (11, 12) to the coil spring 9. The cylindrical sections (43, 43') carry a multiple outer thread (44, 44') onto which are screwed respective portions 14 of turns 42 on the ends (10, 13) of the coil spring 9. The attachment elements (11, 12) are held approximately on the longitudinal center axis 15 of the coil spring 9 axially at a spacing 16 to each other.

As shown in FIGS. 1 to 4, a coupling member 17 is provided as a displacement limiter and tear-off guard for the coil spring 9. The coupling member 17 passes centrically through the coil spring 9 and bridges the axial distance 16 between the attachment elements (11, 12). The coupling member 17 is held as a rope in cylindrically-shaped receptacle sections (31, 31') of the attachment elements (11, 12) so that it cannot separate therefrom. The rope 18 is especially a rigid rope 26. For this purpose, the rope 18 carries a first holder 21 in the region of its end 19 and a second holder 22 in the region of its end 20. The rope 18 is preferably configured as a steel rope 27 having a breaking load of more than 1,000 N. The holders (21, 22) have respective end faces (23, 24) facing toward each other. The holders (21, 22) grasp behind respective edges (25, 25') of the attachment elements (11, 12) with their respective end faces (23, 24). The holder 21 is held in the receptacle section 31 of the attachment element 11 by an extension 72 on the housing (preferably on the cooling rib 60). The projection 72 projects axially into the receptacle section 31 and holds the rope end 19 and/or the holder 21 in the receptacle section 31 so that it cannot separate radially therefrom. The holders (21, 22) are preferably pressed onto the steel rope 27 and form, together with the steel rope 27, the coupling member 17 having a high tensile strength.

Figure 1:
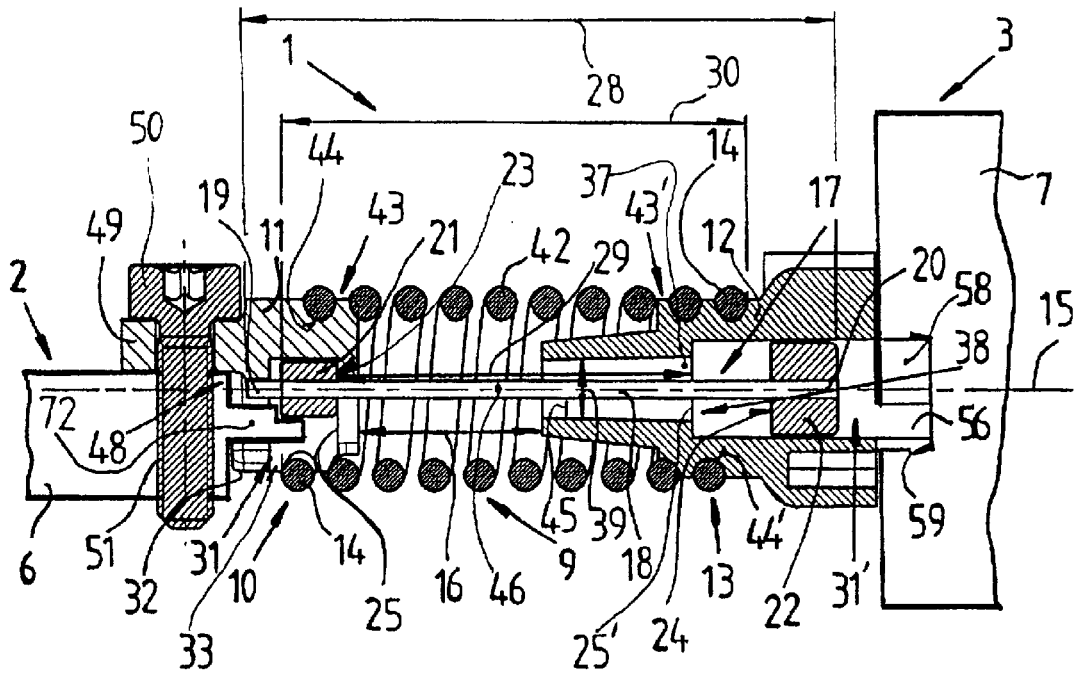
FIG. 1 is a side elevation view, in section, of a vibration damper according to the invention.

As shown in the longitudinal section view through the vibration damper 1 in FIG. 1, the length 28 of the rope 18 between the attachment elements (11, 12) is greater than the distance 29 of the edges (25, 25') which lie between the holders (21, 22). The length 28 of the rope 18 is greater than the length 30 of the coil spring 9 in order to facilitate assembly of the coupling member 17 in the coil spring. With these constructive measures, it is made possible that the coupling member 17 does not hinder the longitudinal expansion and bending of the coil spring 9 during operation of the portable handheld work apparatus. The embodiments of the vibration damper shown in FIGS. 1 to 10 have coupling members with cylindrically-shaped holders. The holders are guided with slight radial play in corresponding ones of the cylindrically-shaped receptacle sections (31, 31') in the respective attachment elements (11, 12). The coupling members 17 shown in FIGS. 1 and 3 are provided with holders of different diameters. The second holder 22 is guided radially into the receptacle section 31' of the second attachment element 12 and is axially movably journalled therein and has a greater maximum outer diameter 35 than the maximum outer diameter 36 of the first holder 21.

At the base 38 of the receptacle section 31' for the second holder 22, a passthrough opening 37 is configured centrally with a somewhat greater diameter 39 than the maximum outer diameter 36 of the first holder 21. The passthrough opening 37 is circular and opens into a cylindrical section 45 of the second attachment element 12 so that a through bore is guided starting from the through opening 37 through the attachment element 12 up to close to the axial center 46 of the coil spring 9. The cylindrical section 45 or the through bore is guided in a section of the attachment element 12 which tapers on its outer surface conically toward the axial center 46 of the coil spring 9. In this way, it is avoided that the attachment element 12 hinders a possible bending of the coil spring 9 during operation of the vibration damper 1.

The first holder 21 lies with slight radial play in the receptacle section 31 of the attachment element 11. A slot 33 is guided radially from the receptacle section 31 over the entire axial length of the attachment element to the peripheral edge 32 of the attachment element 11. As shown in FIG. 3, the width 41 of the slot 33 is less than the maximum outer diameter 36 of the holder 21 and is slightly greater than the diameter 47 of the steel rope 27. The axial end 48 of the attachment element 11 faces away from the cylindrical section 43. At the end 48, a tongue-shaped section 49 is formed as one piece on the attachment element 11 for receiving a threaded bolt 50. The threaded bolt 50 passes transversely to the center longitudinal axis 15 through the tongue-shaped section 49 and is fixed with its thread 51 in the first component 2, the engine housing 6 (see FIG. 4).

The assembly of the vibration damper according to FIGS. 1 to 4 takes place in the following manner. The attachment element 12 is screwed onto the end 13 of the coil spring 9 until the end of the coil spring 9 comes in contact engagement against a stop 52 (see FIG. 2) of the attachment element 12. The coupling member 17 comprises the steel rope 27 and the holders 21 and 22 formed thereon on the respective rope ends. The coupling member 17 is first pushed with the holder 21 into the receptacle section 31' of the attachment element 12 and is guided through the through opening 37 and the cylindrical section 45 so far that the holder 22 comes to rest in the receptacle section 31'. The coupling member 17 passes through the coil spring 9 so far that the holder 21 can be guided into the receptacle section 31 of the attachment element 11. For this purpose, the rope 27 is guided radially from the peripheral edge 32 of the attachment element 11 through the slot 33. Thereafter, the attachment element 11 is screwed onto the end 10 of the coil spring 9. The coupling member 17 passes centrally through the coil spring 9 and is guided with axial play between the attachment elements 11 and 12. The vibration damper 1 can be fixed to the first component 2 and to the second component 3.

As FIGS. 2 and 3 show, sleeve-shaped sections 53 having blind bores 54 therein are formed on the peripheral edge of the attachment element 12. The sleeve-shaped sections 53 lie opposite each other with respect to the longitudinal center axis 15. In this way, the attachment element 12 can be fixed on the second component. A flattening 55 on the attachment element 12 functions for the surface support of the attachment element 12 on the second component. The flattening 55 extends over a plane transversely to the longitudinal center axis 15. The support surface is defined by the flattening 55 and is selected to be as large as possible because of a diameter of the attachment element 12 in the region of the flattening 55 which diameter is enlarged compared to the diameter of the cylindrically-shaped section 43'.

The vibration damper shown in FIGS. 1 to 3 includes two tongues 56 at its attachment element 12. The tongues 56 project from the flattening 55 and have latching lugs 57 facing radially away from the longitudinal center axis 15. The tongues 56 lie opposite each other with respect to the longitudinal center axis 15 and engage in an assembly opening 58 on the component 3 in the assembled state of the vibration damper 1. The latch lugs 57 of the tongues 56 grasp behind the peripheral slot 59 of the assembly opening 58 and are thereby radially latched with the assembly opening 58. The vibration damper 1 is, in this way, secured axially and radially. Accordingly, a simple preassembly of the vibration damper is made possible with the attachment element 12 on the component 3.

FIGS. 2 and 3 show that the attachment element 12 is configured as a ribbed hollow body in the region of the flattening 55 in order to save material and weight.

FIG. 4 shows the vibration damper 1 fixed between the cooling rib 60 of the engine housing 6 and the handle 7. In the region of the flange point of the vibration damper 1, the handle 7 has a sleeve-shaped protuberance 61 radially covering the attachment element 12.

FIGS. 5 to 10 show embodiments of compact vibration dampers 1. The vibration dampers of FIGS. 5 to 10 essentially comprise the coil spring 9, two attachment elements 11 and 12 at the respective axial ends of the coil spring 9 and a coupling member 17 bridging the axial distance 16 between the attachment elements 11 and 12. The coupling member 17 comprises an elastic rope 18 having holders (21, 22) fixedly connected to the rope at respective ends (19, 20) thereof. The holders (21, 22) are cylindrically configured and have approximately the same diameter so that the coupling member can be built in as desired. In the assembled state, the coupling member 17 projects eccentrically through the vibration damper 1, that is, at a radial distance 40 to the longitudinal center axis 15 of the coil spring 9.

Figure 6:
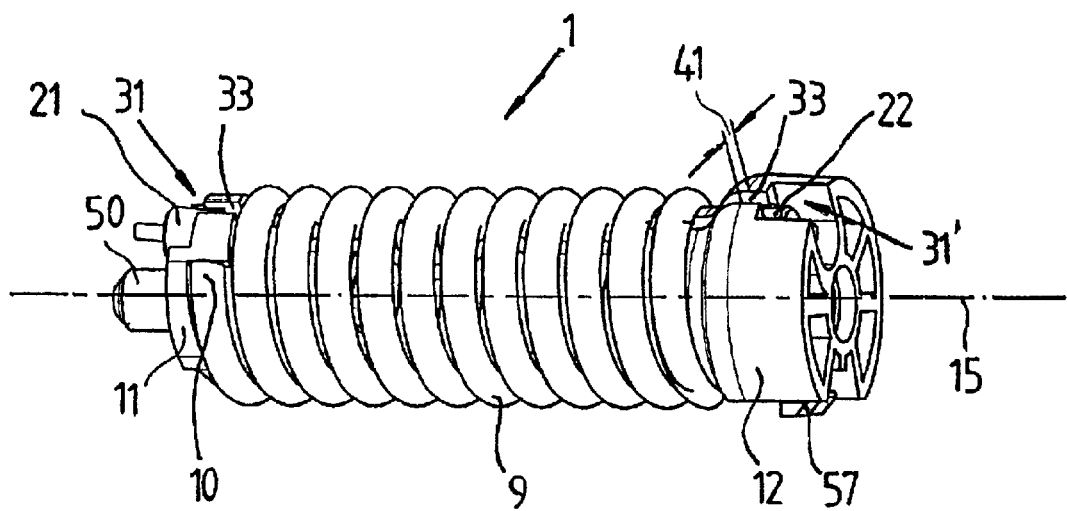
FIG. 6 is a schematic of the vibration damper of FIG. 5.
Figure 7:
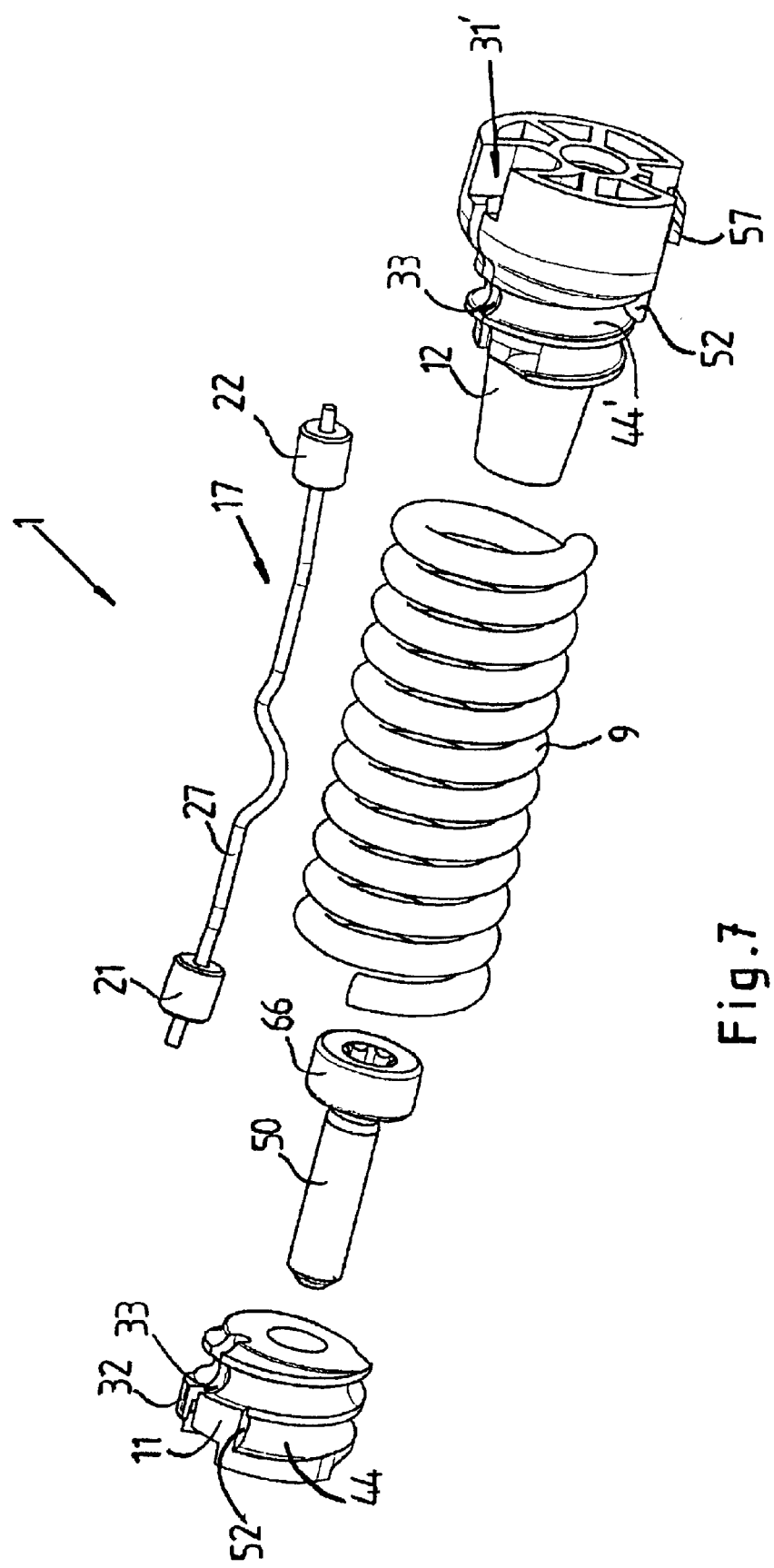
FIG. 7 is a schematic exploded view of the vibration damper of FIG. 5.
Figure 8:
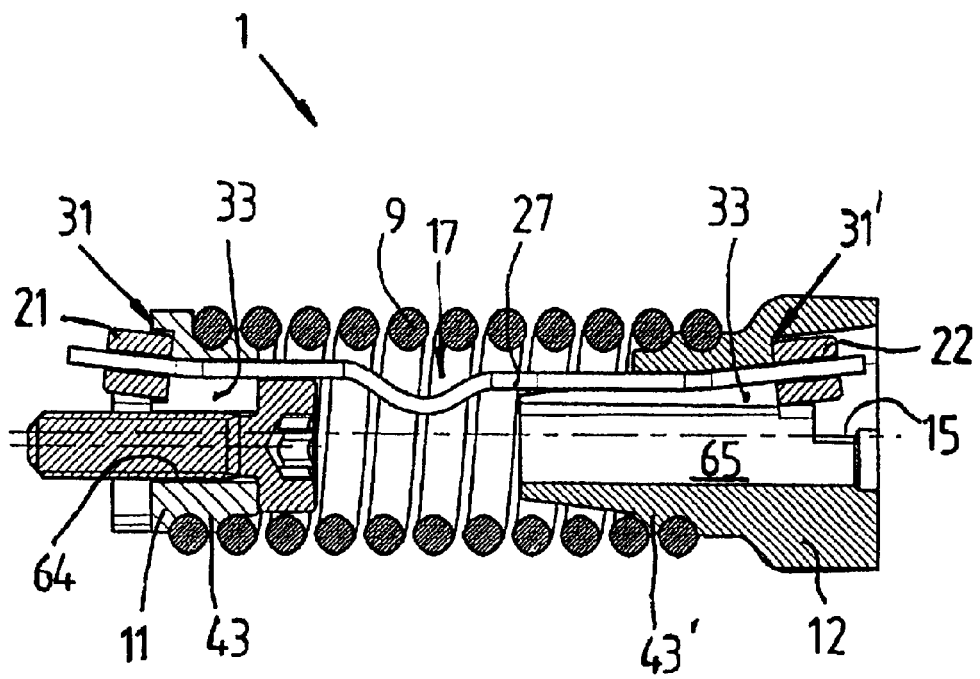
FIG. 8 is a longitudinal section view through another embodiment of the vibration damper of the invention.
Figure 9:
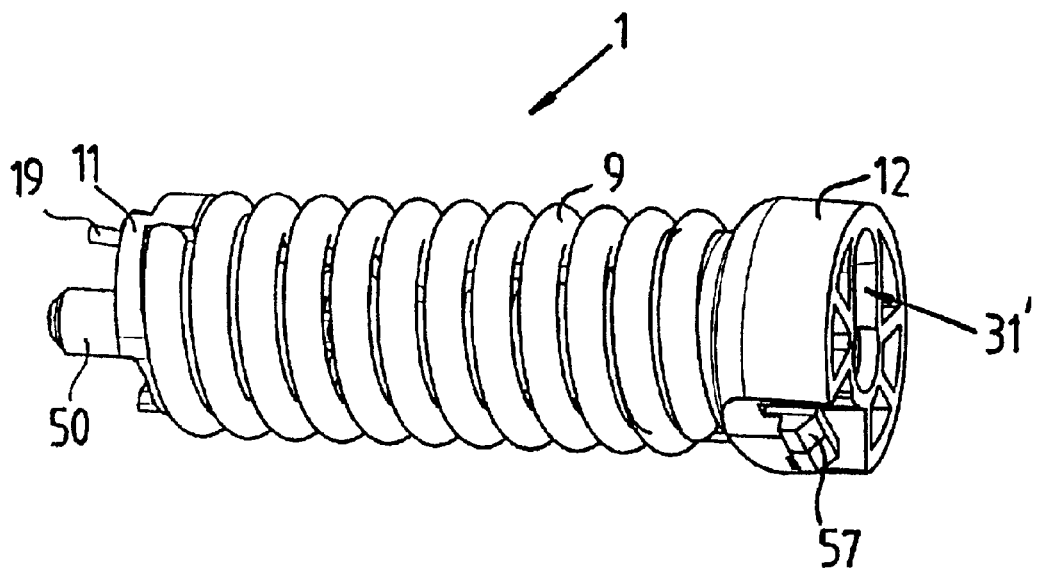
FIG. 9 is a schematic view of the vibration damper of FIG. 8.
Figure 10:
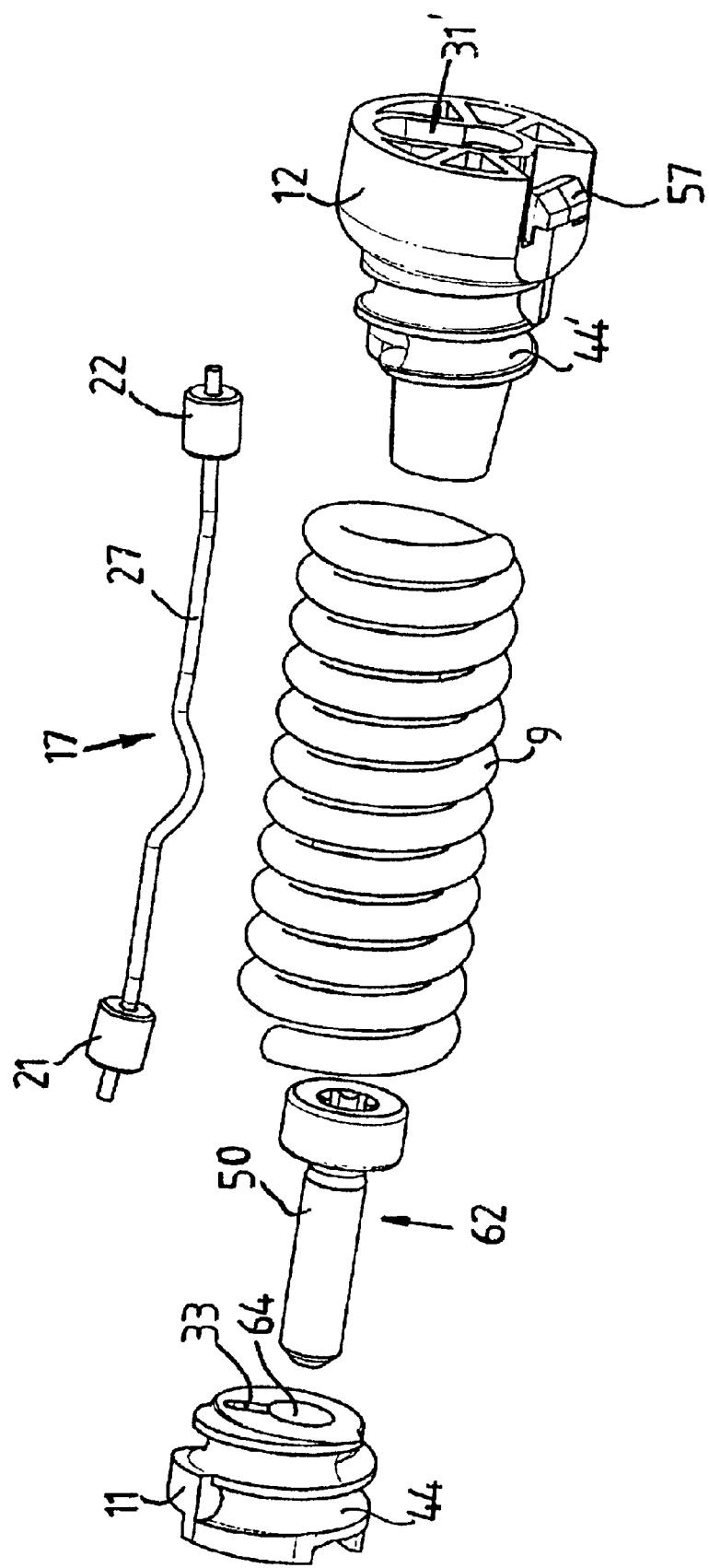
FIG. 10 is a schematic exploded view of the vibration damper of FIG. 8.

The attachment elements 11 and 12 of the vibration dampers 1, which are shown in FIGS. 5 to 10, are configured in the same way as in FIGS. 1 to 4 with a cylindrical section (43, 43'). The cylindrical sections (43, 43') of the attachment elements (11, 12), which have a dome-like configuration, carry a multiple external thread (44, 44') onto which the respective sets of component turns 14 of the respective ends (10, 13) of the coil spring 9 can be screwed. In order to make possible a compact structural assembly with low radial dimensions of the vibration damper 1, the connecting elements 62 and 63, which are necessary for fixing the vibration damper, are positioned with an axial parallel alignment to the longitudinal center axis 15 essentially within the coil spring. For this purpose, the first attachment element 11 has an axially extending passthrough bore 64. In the assembled state of the vibration damper in FIG. 5, a threaded bolt 50 passes through the through bore 64 as a connecting element 62. The head 66 of the threaded bolt 50 is arranged in the interior of the coil spring 9 and the thread portion of the threaded bolt 50 projects outwardly and can, in this way, be screwed into the component 2. As the first attachment element 11, the second attachment element 12 has an axially extending through bore 65 which functions as receptacle for the connecting element 63 between the second component 3 and the attachment element 12. The attachment elements 11 and 12 of the embodiment of a vibration damper shown in FIGS. 8 to 10 are also attached to the components 2 and 3 in the same manner.

Figure 5:
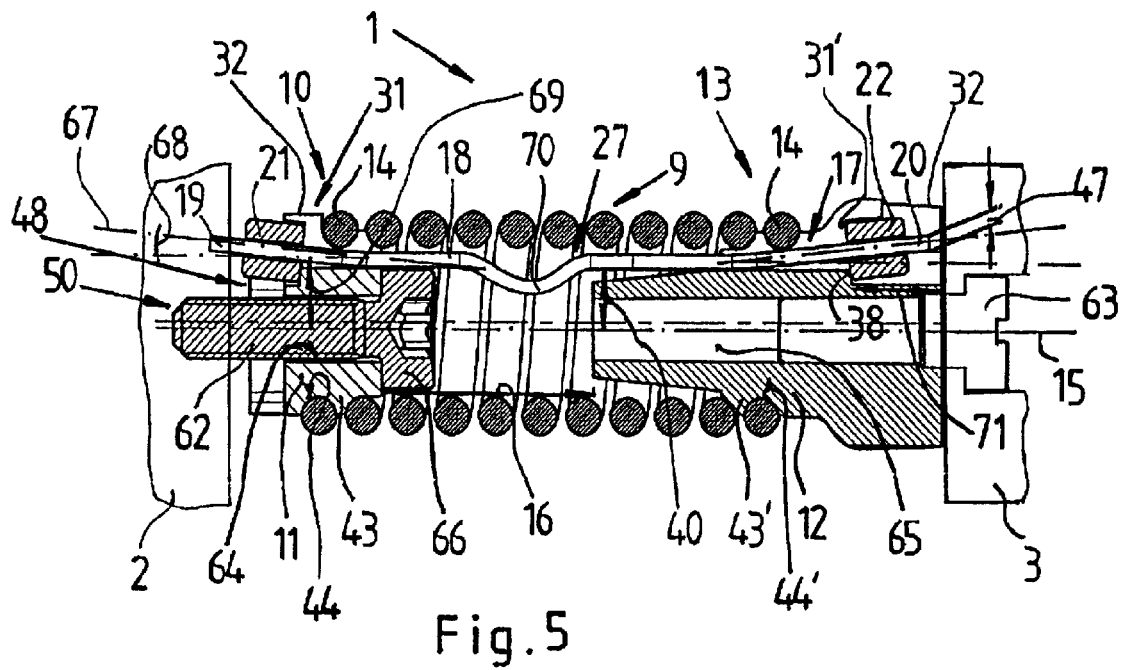
FIG. 5 is a longitudinal section view of a further embodiment of the vibration damper of the invention.

As shown in FIGS. 5 and 6, the attachment element 11 has a receptacle section 31 which extends from its axial end 48 to the coil spring 9. The receptacle section 31 is configured to have a cylindrical shape and has a longitudinal axis 67 inclined toward the longitudinal center axis 15. The longitudinal axis 67 assumes an acute angle 68 to the longitudinal axis 15. The receptacle section 31 is worked into the attachment element 11 at a radial distance 69 to the longitudinal center axis 15. In the same way, the receptacle section 31' is arranged in the second attachment element 12. The holders 21 and 22 are held in the corresponding receptacle sections. The rope 27 is guided in the respective slots 33 which extend radially from the respective peripheral edges 32 of the attachment elements to the receptacle sections. The rope 27 has, at approximately its center, a quasi S-shaped portion 70 directed toward the longitudinal center axis 15 as shown in FIG. 5. The S-shaped portion 70 functions as a length excess of the rope 27 to compensate for changes of length of the coil spring 9 during operation of the vibration damper 1 and functions also as a pregiven displacement limiter for the coil spring 9.

FIGS. 6 and 7 show the disposition of the respective slots 33 in the attachment elements 11 and 12. The slot 33 has a somewhat greater width 41 than the rope diameter 47 of the rope 27. As shown in FIG. 7, the slots 33 widen at a distance of approximately one third of the respective axial depths 21 of the respective receptacle sections viewed from the base 38 of the receptacle sections to a width which is greater than the respective outer diameter (35, 36) of the respective holders 22 and 21 which come into contact engagement in the receptacle sections. Because of the widened slot 33, the holders 21 and 22 can be introduced radially from the outside into the respective receptacle sections (31, 31') of the attachment elements 11 and 12 and are held in their positions in the attachment elements by the threadably-engaged coil spring.

As FIGS. 7, 9 and 10 show, radially outwardly projecting latching lugs 57 are arranged on the attachment element 12 approximately on the side lying opposite the receptacle section 31' of the second attachment element 12. The vibration damper 1, which is shown in FIGS. 8 to 10, is, with respect to its outer shape, approximately the same as the vibration damper shown in FIGS. 5 to 7. However, and as shown especially in FIGS. 8 and 10, the coupling member 17 is guided from the through bores 64 and 65 radially outwardly into the respective receptacle sections. Each of the slots 33 extends radially outwardly for this purpose starting from the through bores 64 and 65. The same components have the same reference numerals as in FIGS. 5 to 7.

It is understood that the foregoing description is that of the preferred embodiments of the invention and that various changes and modifications may be made thereto without departing from the spirit and scope of the invention as defined in the appended claims.

What is claimed is:

1. A vibration damper for mounting between first and second components of a portable handheld work apparatus, the vibration damper comprising:

a coil spring defining a longitudinal center axis and having first and second end portions;

first and second attachment elements;

said coil spring being securely attached at said first end portion with said first attachment element to said first component;

said coil spring being securely attached at said second end portion with said second attachment element to said second component;

said first end portion of said coil spring having several first turns and said second end portion of said coil spring having several second turns;

said first end portion form-tightly engaging said first attachment element with at least a part of one of said first turns in the direction of said longitudinal center axis;

said second end portion form-tightly engaging said second attachment element with at least a part of one of said second turns in the direction of said longitudinal center axis;

said first and second attachment elements being disposed approximately on said longitudinal center axis and lying at a distance axially opposite each other; and, a coupling member extending through said coil spring to bridge said distance and said coupling member being connected to said first and second attachment elements so as to prevent said coupling member from separating therefrom;

said attachment elements having respective edges; and, said coupling member including a rope having first and second ends; first and second holders arranged on said rope in the region of respective ends of said rope; and, said first and second holders having respective end faces directed toward each other and form-tightly engaging behind said edges, respectively.

2. The vibration damper of claim 1, wherein said rope is an essentially thrust stiff rope.

3. The vibration damper of claim 2, wherein said rope is a steel rope.

4. The vibration damper of claim 1, wherein the length of said rope between said first and second attachment elements is greater than the distance between said edges of said attachment elements.

5. The vibration damper of claim 4, wherein said length of said rope is greater than the length of said coil spring.

6. The vibration damper of claim 4, said first and second attachment elements having first and second cylindrically-shaped receptacle sections, respectively; and, said holders being disposed in corresponding ones of said receptacle sections with slight radial play.

7. The vibration damper of claim 6, at least one of said attachment elements having a slot extending radially from the receptacle section thereof to the peripheral edge of said one attachment element.

8. The vibration damper of claim 6, wherein each of said receptacle sections has an axial length and each of said holders has an axial length; and, the axial length of each of said receptacle sections is greater than the axial length of the holder corresponding thereto.

9. The vibration damper of claim 8, wherein said first holder has a maximum outer diameter lesser than the maximum outer diameter of said second holder.

10. The vibration damper of claim 9, wherein said second attachment element has an approximately central through opening extending from the base of said second receptacle section; and, said through opening has a diameter somewhat greater than the maximum diameter of said first holder.

11. The vibration damper of claim 1, wherein said coupling member is mounted approximately centric to said longitudinal center axis.

12. The vibration damper of claim 1, wherein said coupling member is mounted at a radial distance from said longitudinal center axis.

* * * * *